No. 831,865. PATENTED SEPT. 25, 1906.
J. F. HAZEL.
POWER LIFT SWEEP RAKE.
APPLICATION FILED NOV. 24, 1905.
2 SHEETS—SHEET 1.
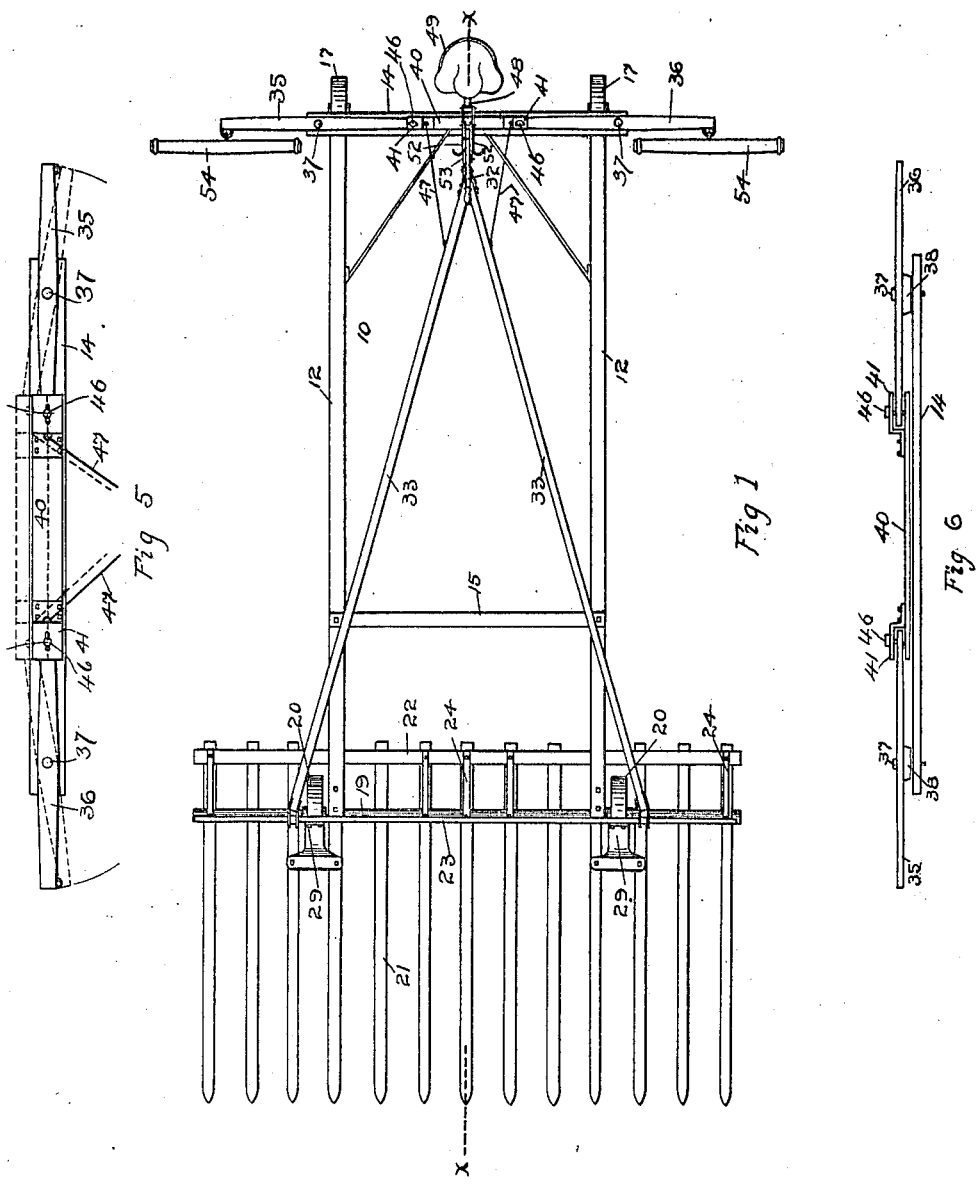
WITNESSES:
INVENTOR
James F. Hazel
BY
Rich'd F. Manning
ATTORNEY

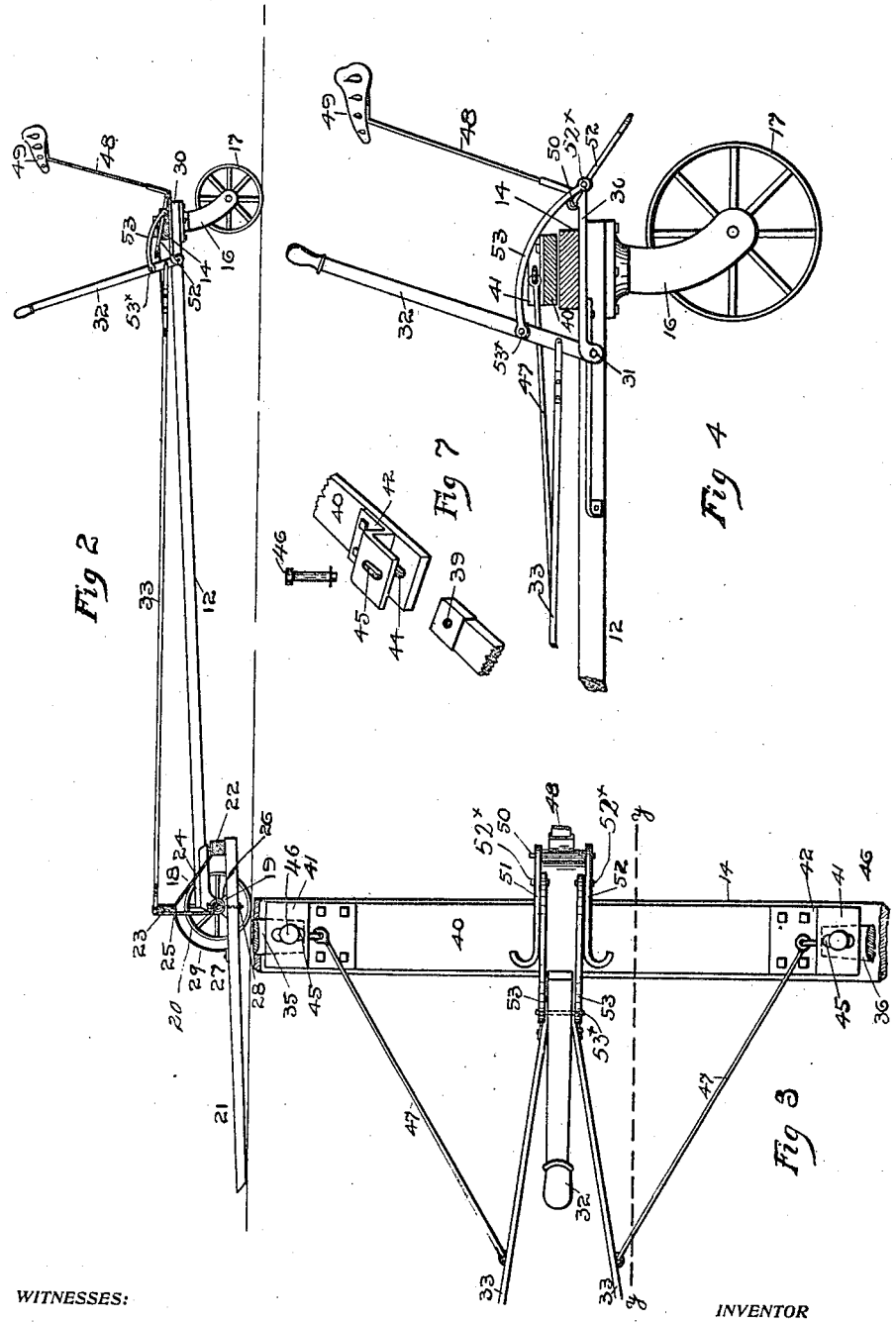

UNITED STATES PATENT OFFICE.

JAMES F. HAZEL, OF CARROLLTON, MISSOURI.

POWER-LIFT SWEEP-RAKE.

No. 831,865.  Specification of Letters Patent.  Patented Sept. 25, 1906.

Application filed November 24, 1905. Serial No. 288,958.

*To all whom it may concern:*

Be it known that I, JAMES F. HAZEL, a citizen of the United States of America, residing at Carrollton, in the county of Carroll and State of Missouri, have invented certain new and useful Improvements in Power-Lift Sweep-Rakes; and I do hereby declare that the following is a full, clear, and exact description of the invention, such as will enable others to make and use the same, reference being had to the accompanying drawings, forming a part of this specification.

The class of rakes to which the invention has particular reference is that known as "sweep" or "push" rakes. The rake-teeth in this class of invention are in advance of the horses and may be raised in position or lowered by hand, so that the rake-teeth when depressed are upon the surface of the ground and the teeth are also lifted by the propelling power applied to the rake. In the latter instance the pulling power thus applied to the rake is variable and the rake-teeth are caused to swerve from one direction to another in the forward movement of the rake.

The objects of my invention are, first, to afford a uniformity in the forward direction of movement of the rake-teeth; second, to lock the rake-teeth either in a raised or lowered position automatically, and, third, to afford additional foot-power to force the rake-teeth into a depressed or lowered position upon the surface of the ground.

The invention consists in the novel construction and combination of parts, such as will be first fully described and then specifically pointed out in the claims.

In the drawings, Figure 1 is a plan view of a push or sweep rake, showing the invention applied thereto. Fig. 2 is a longitudinal vertical sectional view taken on the line *x x* of Fig. 1. Fig. 3 is a detail plan view, enlarged, of the rear end of the frame, showing broken portions of the doubletrees, the power-equalizing connecting-bar, the hand-lever, and portions of the connecting-rods on the lever and the connecting-bar, and the locking-lever. Fig. 4 is a detail vertical sectional view, enlarged, taken upon the line *y y* of Fig. 3. Figs. 5 and 6 are detail plan and side views, respectively, of the rear end beam of the frame, showing the doubletrees and the power-equalizing connecting-bar. Fig. 7 is a detail broken view of the inner end of the doubletree, showing the perforation for the bolt.

Similar numerals of reference indicates corresponding parts in all the figures of the drawings.

Referring to the drawings, 10 indicates the frame of the machine, which consists of the longitudinal side bars 12 12 and the rear transverse end beam 14, with the upper surface and outer ends of which the rear ends of said bars are rigidly connected. With the longitudinal side bars 12 at a point a considerable distance in rear of their forward ends is connected a cross-bar 15. Brackets 16 are connected with the lower surface and at the ends of side bars 12, which extend downwardly and in which are journaled the supporting-wheels 17.

Upon the lower surface and forward ends of the side bars 12 are secured the shaft-hangers 18, in which is journaled a shaft 19, circular in cross-section, the ends of which shaft extend beyond the outer surfaces of the hangers. Upon shaft 19, adjacent to the outer surfaces of the hangers 18, are mounted the wheels 20.

Beneath the shaft 19 are the rake-teeth 21. With the upper surface and rear ends of the rake-teeth is connected rigidly a cross-bar 22, which forms a part of the rake-head. The said bar in position is a short distance in rear of the shaft 19 and corresponds in length with said shaft. Directly above and parallel with shaft 19 is a cross-bar 23, which also forms part of the rake-head, the position of said bar being a short distance above the periphery of the wheels 20. With the rear surface of bar 23 is connected the upper ends of brace-bars 24, the lower ends of which bars are secured to the upper surface of the cross-bar 22. Vertical supporting-bars 25 are connected with the forward surface of cross-bar 23, the lower ends of which bars are extended upon the under surface of shaft 19, and between these lower ends of the supporting-bars 25 and the upper surfaces of the rake-teeth are blocks 26. Through the shaft 19 the lower ends of bars 25, the blocks 26, and the rake-teeth extend screw-bolts 27, upon which bolts are the nuts 28. A wheel guard-plate 29 is connected with the forward surface of the cross-bar 23 at one end, and the other ends extend in a curved line downwardly in advance of the wheels 20 and is connected with the rake-teeth 21.

With the lower surface of the transverse beam 14, at the rear end of the machine, is connected rigidly a plate or casting 30, which extends at right angles to said beam and a short distance from the line of the inner and outer surfaces of the beam. Upon the inner end of plate 30 are downwardly-extended forked portions or bearings 31, with which bearings is pivotally connected the lower end of a hand-operated lever 32. (See Fig. 4.) With the upper surface of the cross-bar 23 of the rake-head and near the outer ends of said bar is connected the forward ends of the rake-head-operating bars or rods 33, the rear ends of which bars or rods are pivotally connected with the sides of the hand-lever 32 at a point a short distance above the pivotal point of the hand-lever with the plate 30.

At each end of beam 14 and upon its upper surface is pivotally connected by pivots or bolts 37 the doubletrees 35 and 36. Extending around the pivots 37 between the doubletrees and beam are washers 38. The inner ends of the doubletrees are perforated at 39, as seen in the detail in Fig. 7.

Upon the upper surface of the beam 14, between the inner ends of the doubletrees, is located a draft-equalizing connecting-bar 40, the ends of which bar are slotted at 44 in the longitudinal direction of the bar. With the upper surface of the ends of the connecting-bar 40 are connected rigidly the inner ends of connecting-plates 41, which are bent at 42 between the ends at right angles and the outer ends extended upon the upper surface of the inner ends of the doubletrees. These outer ends of plates 41 are slotted at 45 in the same direction and are located directly above the slots 44 in the ends of the bar 40.

Through the slots 44 45 in bar 40 and perforation 39 in the doubletrees extend the pivot-bolts 46. With the bent portions 42 of the angle-plates 41 are pivotally connected the inner ends of the links or rods 47, the outer ends of which links are pivotally connected with the rods 33, connecting the rake-head with the hand-lever 32.

With the outer end of the plate or casting 30 is connected a seat-supporting bar or standard 48, which extends upwardly the requisite distance and is slightly narrower in width than plate 30. Upon the upper end of said bar is a seat 49. Upon the upper surface of the plate 30 near the standard 48 is a pivot-bolt 50, extending transversely to the said plate, with the ends of which bolt is connected the lower ends of the foot-operated levers 51 52. With the levers 51 52 are connected pivotally by the pivots 52× the outer ends of the links 53, which extend in an upward curved line of direction and are pivotally corrected at their forward ends by the pivot-bolt 53× with the sides of the hand-lever 32 a short distance above the pivotal point of the rods or bars 33 with said lever. With the outer ends of the doubletrees 35 36 are connected the swingletrees 54, to which power is applied to move the rake.

In order to depress the rake-teeth upon the surface of the ground in the employment of the rake, the foot-levers 51 52 are first raised in position and the lever 32 moved forwardly by the hand into the position as seen in Figs. 1 and 2, the foot-levers 51 52 moving past the pivot 50 in the arc of a circle. In the forward movement of the hand-lever 32 the power is transmitted through the rods 33 to the rake-head, the bars 22 and 23 of which are tilted or rocked forward, the shaft 19 forming the pivotal support. In the position as seen in Figs. 1 and 2 of the foot-levers the hand-lever 32 is locked and the forward movement of the rake is effected by the draft of the horses upon the swingletrees 54, thus taking up the windrows or swaths of the hay or other material upon the ground and obtaining the load. The foot-levers 52 are then raised in position and the lever 32 released, and the pulling power is exerted upon the doubletrees 35 and 36, the lever 32 moving rearwardly in position, and the power is transmitted to the draft-equalizing connecting-bar 40, and the bar is moved rearwardly, as seen in dotted lines in Fig. 3. In this movement the draft on bar 40 is transmitted through draft links or rods 47 to the connecting rods or bars 33, and thence to the rake-head, which is tilted or rocked on the shaft 19 rearwardly, and thus elevating the forward ends of the rake-teeth and elevating or hoisting the load from the ground, the foot-levers 52 moving in the arc of a circle rearwardly past the pivot 50 and locking the lever 32 in its rearward position, and the load is carried any desired distance. In the rearward movement of the connecting-bar the slotted ends of the bar and the doubletrees enable the adjustment of these ends to be readily made. The uniformity of this movement is also secured by the links or rods 47, and the unequal draft or pull upon the doubletrees which heretofore will swerve the rake-teeth from one direction to another is obviated by the connecting-bar 40 and the links 47. Instead of applying the draft-power on the swingletrees to the lifting of the rake-teeth the hand-lever may be employed to raise the load, the foot-levers being first raised in position, as before described.

In the operation of the foot-levers it will be observed that the hand-lever may be locked in either its forward position or when moved rearwardly and that the power of the foot-lever may be augmented by the weight of the driver, thus retaining the teeth of the rake more firmly upon the ground.

Such modifications may be employed as are within the scope of the invention.

Having fully described my invention, what I now claim as new, and desire to secure by Letters Patent, is—

1. In a sweep or push rake a suitable supporting-frame, a rake-head pivotally connected with the forward end thereof and rake-teeth supported by the rake-head, doubletrees pivotally connected near the respective sides and with the rear end of said frame a hand-lever pivotally connected at one end with said frame devices connected with the hand-lever and the rake-head for operating the said rake-head, a draft-equalizing bar and devices connecting the draft-equalizing bar with the inner ends of the doubletrees and links connected with the ends of the draft-equalizing bar and the said devices connecting the hand-lever with the rake-head.

2. In a push-rake the combination with a suitable supporting-frame a rake-head pivotally connected with its forward end and rake-teeth supported by the rake-head, doubletrees pivotally connected near the respective sides and with the rear end of said frame a hand-lever pivotally connected at one end with said frame, connecting-bars connected with the hand-lever and the rake-head for operating the said rake-head, a draft-equalizing bar and slotted connecting devices and pivot-bolts connecting the ends of said draft-equalizing bar with the inner ends of said doubletrees, and links connected with the ends of the draft-equalizing bar and the said bar connecting the hand-lever with the rake-head.

3. In a push-rake the combination with a suitable supporting-frame of a rake-head pivotally connected with its forward end rake-teeth supported by said rake-head and adapted to be elevated and depressed in position, doubletrees pivotally connected near the respective sides and with the rear end of said frame, a lifting-lever pivotally connected at one end with said frame, and devices connecting the lifting-lever with the rake-head, for operating the same a draft-equalizing bar and devices connecting said bar with the inner ends of the doubletrees, links connecting the ends of the draft-equalizing bar with the devices connecting the lifting-lever with the rake-head, and means for locking said lifting-lever in its forward position to depress the rake-teeth.

JAMES F. HAZEL.

Witnesses:
 WM. WALTER BRADY,
 EDWIN RICHARD METCALF.